(12) United States Patent

Stefan et al.

(10) Patent No.: US 9,584,776 B2
(45) Date of Patent: Feb. 28, 2017

(54) MONITORING A PARKING PERMIT OF A MOTOR VEHICLE

(71) Applicant: Ford Global Technologies, LLC, Dearborn, MI (US)

(72) Inventors: Frederic Stefan, Aachen NRW (DE); Uwe Gussen, Huertgenwald NWR (DE); Christoph Arndt Dr habil, Rheinland-Pfalz (DE)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 14/319,030

(22) Filed: Jun. 30, 2014

(65) Prior Publication Data

US 2015/0015709 A1 Jan. 15, 2015

(30) Foreign Application Priority Data

Jul. 15, 2013 (DE) .................. 10 2013 213 748

(51) Int. Cl.
*H04N 7/00* (2011.01)
*H04N 7/18* (2006.01)
*H04N 9/80* (2006.01)
*G08G 1/0962* (2006.01)
*G07B 15/02* (2011.01)

(52) U.S. Cl.
CPC ............ *H04N 7/188* (2013.01); *G07B 15/02* (2013.01); *G08G 1/09626* (2013.01)

(58) Field of Classification Search
USPC ................................. 386/239–248
See application file for complete search history.

(56) References Cited

U.S. PATENT DOCUMENTS

| 5,343,237 A * | 8/1994 | Morimoto | G07B 15/02 340/932.2 |
| 5,910,817 A * | 6/1999 | Ohashi | G06K 9/00208 340/903 |
| 6,133,855 A * | 10/2000 | Kim | B60Q 9/002 340/425.5 |
| 2004/0133464 A1* | 7/2004 | Erskine | G07B 15/02 705/13 |
| 2010/0261465 A1* | 10/2010 | Rhoads | G08C 17/00 455/420 |
| 2011/0063135 A1* | 3/2011 | Groft | G07B 15/02 340/933 |

(Continued)

FOREIGN PATENT DOCUMENTS

| DE | 102010003890 A1 | 10/2011 | |
| GB | 2442049 A * | 3/2008 | H04N 7/18 |
| KR | 20090076868 A * | 7/2009 | G08G 1/017 |

*Primary Examiner* — Hung Dang
(74) *Attorney, Agent, or Firm* — Jennifer Stec; Bejin Bieneman PLC

(57) ABSTRACT

With a method according to the invention for monitoring a parking permit of a motor vehicle, it is determined whether the motor vehicle is in a parking situation in which a parking authorization pass is necessary for a parking permit, and on the occurrence of such a parking situation the presence of a parking authorization pass is checked for and a first information signal is output to a driver of the motor vehicle in the absence of the parking authorization pass. The invention also relates to a device for monitoring a parking permit of a motor vehicle.

10 Claims, 2 Drawing Sheets

(56) References Cited

U.S. PATENT DOCUMENTS

| | | | | |
|---|---|---|---|---|
| 2011/0140927 | A1* | 6/2011 | Lee | G08G 1/207 |
| | | | | 340/993 |
| 2012/0158466 | A1* | 6/2012 | John | G07B 15/02 |
| | | | | 705/13 |
| 2013/0307704 | A1* | 11/2013 | Morales | G08G 1/149 |
| | | | | 340/932.2 |
| 2015/0177362 | A1* | 6/2015 | Gutierrez | B60R 25/245 |
| | | | | 701/519 |

* cited by examiner

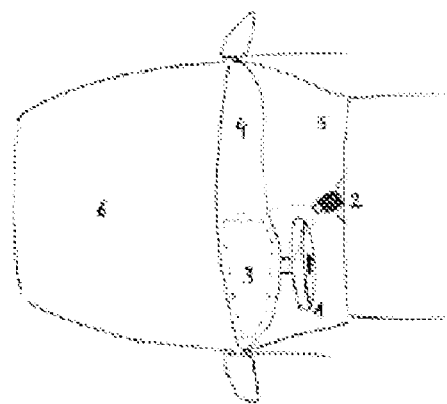
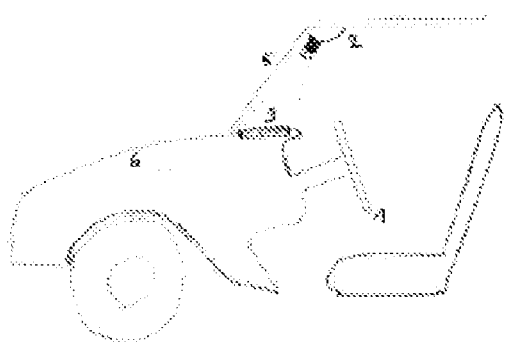
Fig. 1a          Fig. 1b
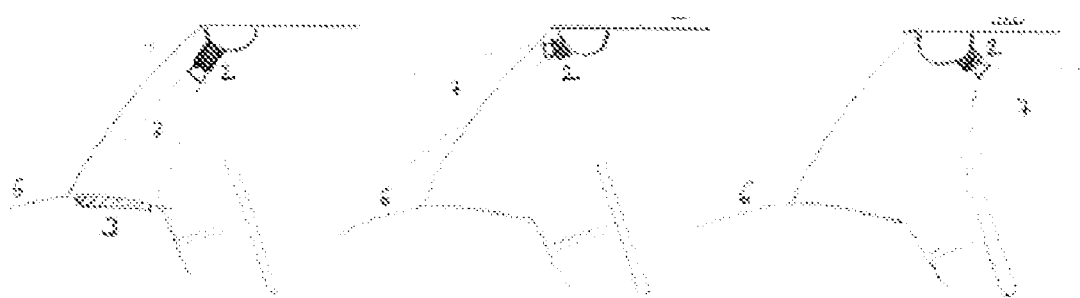
Fig. 2a          Fig. 2b          Fig. 2c

MONITORING A PARKING PERMIT OF A MOTOR VEHICLE

CROSS-REFERENCE TO RELATED APPLICATION

This application claims priority to and all the benefits of German Patent Application No. 102013213748.6, filed on Jul. 15, 2013, which is hereby incorporated by reference in its entirety.

BACKGROUND

Disclosed herein is a method and a device for monitoring a parking permit of a motor vehicle.

Public parking spaces are increasingly limited in their use. Thus, e.g., especially in urban areas, the use of parking spaces is restricted to certain groups of people such as, e.g., residents, and/or use of parking spaces is restricted to certain periods of time or to a limited time duration. Also, parking fees are charged for the use of public or private parking spaces. In general, a parking authorization pass, which must be visibly displayed in the vehicle, is necessary as evidence that a motor vehicle is parked legitimately in such a parking space. The visible display of the parking authorization pass in the motor vehicle provides for simple checking of the parking permit by an officer of the car park operator. Such a parking authorization pass can, e.g., be a resident's parking pass, which provides residents with permanent or temporary parking in a particular parking space, a parking ticket that can be obtained from a parking ticket machine or even a parking disk, which is set to a time of arrival and allows for determination, using said information, of whether a maximum permissible parking time is exceeded.

In all the cases mentioned, it is necessary that a parking authorization pass is visibly displayed in the motor vehicle no later than when leaving the motor vehicle if the parking authorization is not permanently affixed. In particular, it is necessary that an adequate parking ticket is acquired for the duration of the parking after parking a motor vehicle in a parking space managed with a parking ticket machine, and that the parking ticket is, e.g., displayed behind the windscreen of the motor vehicle so as to be externally visible. However, there is the possibility that the parking ticket can be forgotten by the driver of the motor vehicle, e.g., because the driver has not noticed that it is a chargeable parking space, or because the driver has actually purchased a parking ticket but has failed to display the same visibly in the motor vehicle.

It is known from DE 10 2010 003 890 A1 that, depending on a recorded parking position of a motor vehicle in a recognized parking situation and with specified parking prohibition information, it is determined whether the motor vehicle is in a current or future valid parking prohibition zone or even on a chargeable parking space. If the motor vehicle is in a parking prohibition zone, a signal for signaling the parking prohibition is generated. If the motor vehicle is in a chargeable parking space, specified parking charge information is retrieved from an information database and an actual parking time duration is detected. Depending on the actual parking time duration and the specified parking charge information, a parking charge is determined and an instruction to pay the parking charge is forwarded to a specified charging system. This enables a driver of the motor vehicle to be reminded of a parking prohibition zone; furthermore, payment of the parking fees in a convenient manner can be provided. However, adaptation of the infrastructure of the car park or of the charging system of the car park operator is necessary for this purpose.

DESCRIPTION

As disclosed herein, a parking permit is monitored that can be detected by a parking authorization pass visibly displayed in the motor vehicle. It is thereby determined whether the motor vehicle is in a parking situation in which a parking authorization pass to be displayed in the motor vehicle is necessary for a parking permit. In particular, monitoring for the occurrence of such a parking situation is carried out continuously during the operation of the motor vehicle. When such a parking situation occurs, the presence of a parking authorization pass in the motor vehicle is checked for and in the absence of a parking authorization pass a first information signal is output to a driver of the motor vehicle. The first information signal is output no later than when the driver of the motor vehicle leaves said vehicle.

Because the occurrence of a parking situation in which a parking authorization pass is necessary is detected automatically, the presence of the parking authorization pass is checked for and in the absence of the parking authorization pass a first information signal is output to the driver of the motor vehicle, and the driver can be reminded to display an available parking authorization pass visibly in the motor vehicle or to obtain a parking ticket from a parking ticket machine and to visibly display the same in the motor vehicle. Furthermore, the driver can thus be notified, e.g., in a parking situation in which a resident's parking pass is necessary. This facilitates the proper parking of the motor vehicle for the driver. A change of the usual process for purchasing a parking permit is not necessary and generally no adaptation of the infrastructure of the car park is necessary.

The occurrence of the parking situation in which a parking authorization pass is necessary for a parking permit may be determined based on location data of the motor vehicle. Such location data can especially be provided by a navigation system, e.g., on the basis of GPS data. By comparing location data with data that can be retrieved relating to a car park identified with the aid of the location data, it can be determined whether the motor vehicle is currently in a parking space with restricted parking permission. The data can, e.g., be retrieved from a database stored in a memory device associated with the motor vehicle or even from an external database accessible via wireless communications. This enables the occurrence of such a parking situation to be determined in a simple manner.

Travel data of the motor vehicle may be used to determine the occurrence of a parking situation. The travel data can be data about the speed of travel, the use of a manual or automatic gear shift, the operation of the pedals of the motor vehicle, or even the activation of a parking assistance system. It can be determined from such data whether the driver is carrying out a parking maneuver. This provides for a reliable determination of whether the motor vehicle is parked in a particular parking space. Thus it can be reliably determined whether the parking situation in which a parking authorization pass is necessary has occurred.

The presence of a parking authorization pass may be determined by an optical mechanism that detects whether the parking authorization pass is present in a presentation area of the motor vehicle. Such a presentation area is, e.g., a shelf on the top of the instrument panel or behind the windscreen, which can easily be seen from outside of the motor vehicle and which is not generally used for storing other objects. This enables the presence of the parking authorization pass to be identified in a simple and reliable manner.

The optical mechanism for detecting the presence of the parking authorization pass comprises a camera and an image analyzer disposed after the camera. The image analyzer can be arranged such that a parking authorization pass can be identified in the image recorded by the camera.

In a further advantageous manner, the camera can be used for other tasks with the motor vehicle in travelling mode, e.g., for recording of an image of a scene in front of the vehicle for use in the context of a lane assistance system or for adaptive cruise control. The camera can, however, alternatively or additionally, also be used for recording an image of the interior of the motor vehicle, e.g., in order to determine a level of fatigue of the driver by observation of the driver and analysis of the driver's behavior with the aid of the image analyzer and to provide a corresponding warning signal. For example, a holder for the camera or a deflection mirror disposed in front of the camera can be made pivotable for using the camera for said different tasks. Advantageously, it can be provided that, based on an analysis of the location and/or travel data of the motor vehicle, the camera or the deflection mirror is automatically pivoted on detecting a parking situation for recording an image of the presentation region, and on detecting the ending of the parking situation the camera or the deflection mirror is automatically pivoted for recording an image of the scene in front of the vehicle or of the interior. This enables a plurality of advantageous functions of the motor vehicle to be fulfilled economically with a single camera.

The presence of the parking authorization pass in the presentation area of the motor vehicle can be identified based on a specifiable shape of the parking authorization pass and/or a specifiable brightness and/or color of the parking authorization pass. The image analyzer can be especially designed such that a region of specifiable shape with a likewise specifiable brightness and color, e.g., a rectangular white region, is identified as a parking authorization pass. This especially enables a different object placed in the presentation area of the motor vehicle to be distinguished from a parking authorization pass. The shape, brightness and/or color of the parking authorization pass necessary in the respective present parking situation can be stored together with the data of the respective car park, e.g., in the memory device or in the external database, and can be retrieved on determining the parking situation. This enables the presence of the parking authorization pass in the presentation area to be identified in a particularly simple and reliable manner.

According to an embodiment, a presentation position of the parking authorization pass is checked. In particular, it is determined whether the visible side of the parking authorization pass in the image of the presentation region recorded by the camera has a pattern representing a legend containing the data required to check the validity of the parking authorization pass. If it is determined that the visible side of the parking authorization pass does not have a suitable pattern, it can be concluded that the parking authorization pass was inadvertently placed with the rear facing upwards, or is kinked or folded. It can further be determined, e.g., whether the parking authorization pass is only partly disposed within the presentation region. In the latter case, it can, e.g., be concluded that the parking authorization pass lies partly in a region of the shelf that is not externally visible. In such cases, the legend of the parking authorization pass is probably not legible from the outside of the motor vehicle, so a check of the parking permit by an officer of the car park operator is not possible. If a presentation position of the parking authorization pass that is inadequate for visibility from the outside of the motor vehicle has been determined, then a second information signal is output to the driver of the motor vehicle. This allows the driver of the motor vehicle to be made aware of the incorrect arrangement of the parking authorization pass.

Further, a check may be made as to whether the parking authorization pass provides the parking permission necessary in a given parking situation. Accordingly, data about the parking permit necessary for the use of the relevant car park and the parking authorization pass required for verification of the parking permit may be stored in the database and can be retrieved. It can be determined from said data, e.g., whether and when the parking space is chargeable, whether a cost-free parking period is provided, and where the nearest parking ticket machine is located; in addition, it can be determined whether a parking space may be a private parking space of the vehicle owner. The form, e.g., by an imprint in the form of a pattern or a letter combination or number combination, in which the necessary parking permit is issued, can also be inferred from the data. In particular, the letters and/or numbers printed on the parking authorization pass, e.g., on a parking ticket, can be read by optical pattern recognition with the aid of the image analyzer, and the existence of a parking permit can be checked by comparison with the data stored in the database. This also makes it possible for different parking authorization passes to be associated with a parking space, e.g., a parking ticket to be obtained from a machine for a temporary parking permit or a permanently valid resident's parking pass, and the corresponding different parking authorization passes are automatically recognized. In addition, a parking permit that can be verified by a parking disk can be checked by taking into account the current maximum parking duration that can be retrieved from the database and by comparison with a current time of day obtainable from a vehicle information system. If it is determined thereby that the parking authorization pass disposed in the presentation area is inadequate for the currently necessary parking permit, or that, e.g., the parking disk is set to an incorrect time of arrival, a third information signal is output to the driver in order to make the driver aware of the lack of an adequate parking permit.

If the parking permit is a temporary parking permit, the current validity of the parking permit and especially the duration of the parking permit currently still available, i.e., the remaining parking time, can be determined from the data obtainable from the parking authorization pass, taking into account the current time of day. The remaining parking time can be communicated to the driver of the motor vehicle and e.g., displayed on a display device. If a determined end time point of the temporary parking permit is reached, or a warning time point that is in advance of the end time point of the temporary parking permit by a lead time is reached, a fourth information signal is output to the driver. The check can especially be carried out multiple times or continuously during the duration of the parking process. This enables the driver to be reminded that the permissible parking period has expired or will expire shortly. Also if the parking permit is already no longer valid at the point in time of the driver leaving the motor vehicle, a corresponding information signal can be output. This allows the driver to be made aware that there is e.g., an old or expired parking authorization pass in the presentation area of the motor vehicle.

It may be determined how long it is expected to take for the driver of the motor vehicle to reach the motor vehicle if he leaves the motor vehicle and has moved away from the motor vehicle. For this purpose a current location or location area of the driver is especially determined, e.g., based on information of a cellular network or of a positioning system carried by the driver, e.g., of a GPS receiver. The time that the driver has needed to reach his current location, as well as a possible waiting time and travel time when using public transport, can also be taken into account during this determination. The determined expected period of time for the return of the driver to the motor vehicle is known as the lead time, i.e., the fourth information signal is output to the driver at a warning time that is in advance of the end time point of the temporary parking permit by the expected time to return period. Furthermore, a specifiable tolerance range by which the warning time can be shifted can additionally be taken into account. This permits the driver to be made aware in good time of the impending expiry of the permitted parking period.

The information signals mentioned can be signals of a different type, especially audible, visual or haptic signals. The first, second, third and/or fourth information signal can e.g., each be a simple warning note, a light signal or a vibration of a signaling mechanism that can be felt, whereby the information signals can be identical or different. It may be that, from the respective information signal, it is determined which of the mentioned situations currently exists. Thus the driver can e.g., be made aware, by a text dependent on the respective situation shown by the output of the information signal on a display, that there is no parking authorization pass present, that this is not correctly displayed, that it is no longer valid or that the parking time will expire shortly. This further facilitates correct parking of the vehicle for the driver.

Whereas the first, second and third information signals may be transmitted to the driver on leaving the vehicle and for this purpose can especially be generated as visual or audible signals by a signaling device associated with the motor vehicle, the fourth information signal may be transmitted by wireless transmission to a receiving and display mechanism carried by the driver, e.g., to a mobile telephone, a smartphone, or to some other wireless communications device carried by the driver. This permits the driver to always be made aware of the impending achievement of the end time point of the parking permit and facilitates a timely return to the motor vehicle for the driver prior to the expiry of the parking permit. The other information signals can also be transmitted via wireless transmission means to a receiving and display means carried by the driver.

A device for monitoring a parking permit of a motor vehicle is configured for detection of a parking situation in which a parking authorization pass is necessary for a parking permit, determining the presence of a parking authorization pass and signaling output of an information signal to the driver of the motor vehicle. The device further includes a processor arranged to carry out the above-described method for monitoring the parking permit of the motor vehicle. The processor can especially be part of an electronic control device of the motor vehicle. For example, a location mechanism, which can e.g., be in the form of a navigation system of the motor vehicle, can be used for determining the parking situation. The device can comprise a memory device. The memory device can store data about parking spaces and about a necessary parking permit that may be required. The memory device can further store data about the parking authorization pass to be displayed for verification of the parking permit. Such data can, however, also be received by wireless transmission. A camera and an image analyzer connected downstream thereof are may be provided as sensors, which are arranged to automatically check the presence and possibly the validity of a parking authorization pass in a presentation area of the motor vehicle on the occurrence of a parking situation, taking into account the data about the respective parking space. The signaling can e.g., be in the form of a loudspeaker or buzzer for outputting an audible signal, an LED for outputting a visual signal or a vibrator for outputting a haptic signal, and can be associated with the motor vehicle or even with a receiving and display device that can be carried by the driver, e.g., a mobile telephone, a smartphone or a portable computer, and that can be controlled by the processor means of the device via wireless transmission means. The signaling means can also comprise a text display for transmitting further information, e.g., regarding the situation that has led to outputting the information signal or the remaining parking time.

In the figures:

FIGS. 1a and 1b show a front region of a motor vehicle in a schematic plan view and in a schematic sectional view;

FIGS. 2a to 2c show the front region of the vehicle cab in the view of FIG. 1b with different camera orientations.

Figure 3:
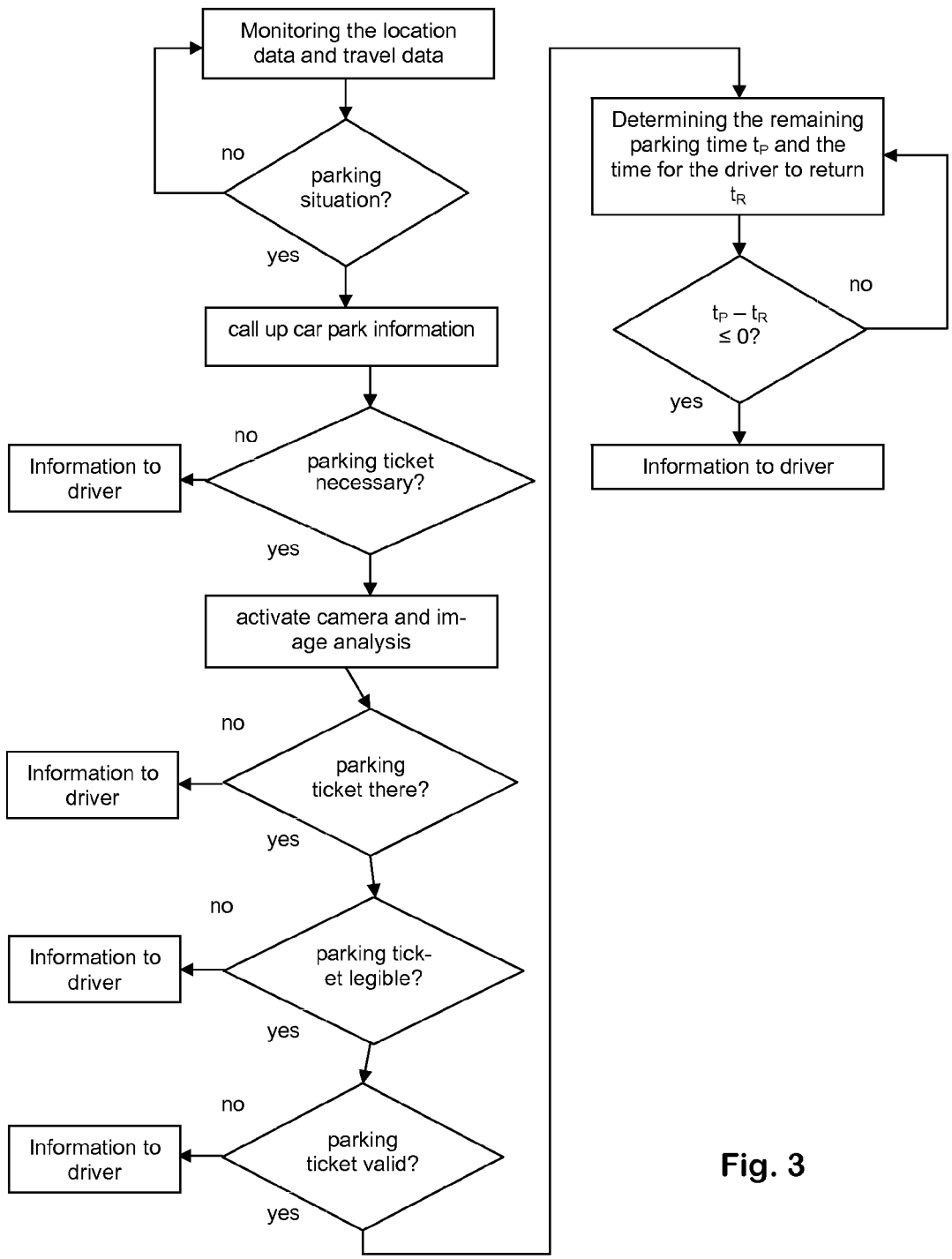
FIG. 3 shows a flowchart of an exemplary method.

In FIGS. 1a and 1b a front region of a motor vehicle is illustrated. On the driver's side, which is indicated by the steering wheel 1, a presentation area 3 that can be observed by a camera 2 is disposed. The area 3 comprises the driver's side region of the top of the instrument panel 4. The camera 2 is disposed in an upper region of the interior of the motor vehicle behind the windscreen 5, e.g., in a region of an interior mirror. The engine hood is referred to in FIGS. 1a and b with the reference character 6.

The presentation area 3 is a predetermined region within the motor vehicle, in which a parking authorization pass, e.g., a parking ticket, a parking disk or a permanent parking pass, is to be placed so that this is externally visible. The presentation area 3 can e.g., be characterized by boundary lines or even by a special coloring in order to facilitate correctly displaying the parking authorization pass for the driver.

In FIGS. 2a to 2c, different possible uses of the camera 2 are illustrated. FIG. 2a shows the orientation of the camera for observation of the presentation region 3 and for recognizing a parking authorization pass placed therein. In this case the camera 2 is oriented such that the field of view 7 coincides with or contains the presentation area 3. As shown in FIG. 2b, the camera 2 can be directed forwards in situations in which the observation of the presentation region 3 is not necessary, i.e., e.g., during the normal travelling mode of the motor vehicle, so that the scene in front of the vehicle lies within the field of view 7 of the camera 2 and can be recorded by the camera 2. The image recorded by the camera 2 in said orientation can be used in a driver assistance system, e.g., a lane assistance system or an adaptive cruise control system. As illustrated in FIG. 2c, instead of or in alternation with the orientation shown in FIG. 2b, the camera 2 can be directed into the interior of the motor vehicle, so that especially the driver of the motor vehicle is in the field of view 7 of the camera 2. By analysis of the images recorded by the camera, e.g., the existence or even a level of fatigue of the driver can be determined, in order to possibly output a corresponding warning signal. For implementation of the different directions of view of the camera 2, the camera 2 can be attached to a motorized swiveling mounting, which is controlled by a control device of the motor vehicle based on travel data of the motor vehicle.

In FIG. 3, a flowchart of an exemplary method is shown in simplified form. During the operation of the motor vehicle, monitoring of location data and travel data of the motor vehicle is carried out continuously or with a specifiable cycle in order to detect an occurrence of a parking situation. For this purpose, in particular location data are taken from an e.g., GPS supported navigation system of the motor vehicle and the speed of travel of the motor vehicle and the variation of the speed of travel, a gearbox selection setting, the operation of the pedals and/or the activation of a parking assistance system are monitored in order to determine whether the vehicle is on a parking space and has been brought to rest there and especially has been parked there.

If it has been detected that a parking situation has occurred, i.e., that the motor vehicle is standing on a parking space, and if this has been identified with the aid of the location data, then data relating to the parking space is retrieved from a memory device of the motor vehicle or even from an external data source, e.g., via a UMTS (Universal Mobile Telecommunications System) access to the Internet. From this, taking into account the time of day and/or the date, which is e.g., provided from a clock associated with the motor vehicle by means of a vehicle information system, it is determined whether a parking authorization pass, e.g., a parking ticket obtainable from a machine, is necessary at the current point in time. If this is not the case, the driver is so informed by a suitable signal or a suitable display in the motor vehicle. Otherwise, if it is determined from the engine being turned off and/or from an operation of the driver's door that the driver has left the vehicle, the driver can be notified that a parking ticket is necessary with a suitable signal. A similar notification can take place if a stopping time of the motor vehicle that is also permissible without a parking permit, e.g., 3 minutes, is exceeded.

If it has been determined that a parking ticket is necessary for a parking permit, then a camera that is directed towards a presentation area of the motor vehicle in which such a parking ticket is to be placed, and an image analyzer that is disposed downstream of the camera, are activated. It is first determined thereafter whether there is an identifiable object, especially with the dimensions of a typical parking ticket, present in the presentation area at all. If this is the case, it will be assumed that a parking authorization pass is present.

Further, using optical pattern recognition, it is determined whether the parking authorization pass is legible and whether the pass is presently valid. It can be identified here whether a parking ticket is bent, folded, placed the wrong way round, covered by other objects, placed with a number of older parking tickets or even, e.g., cannot be read owing to poor lighting. In this case the driver is so informed by a suitable signal or a suitable display. Said steps can each be repeated after a specified time or on the occurrence of another event, e.g., of the closing or of the re-opening of the driver's door.

The called-up data about the parking space can also contain information about the location of a parking ticket machine. Together with the location information, the location of the nearest parking ticket machine can be determined from this information about parking ticket machine locations; the location of the nearest parking ticket machine can also be displayed to the driver. Further, the retrieved data can contain information about the properties of a parking authorization pass applicable to the relevant parking space; said information can be used in order to increase the reliability of identification of the parking authorization pass and the determination of information from the same by pattern recognition.

If there is a legible parking authorization pass in the presentation area, it can be determined whether the same is still valid or whether there is a valid parking ticket among a number detected in the presentation area. If this is not the case, a suitable signal can be produced to so inform the driver. If it has been determined that the parking authorization pass is still valid, then a remaining parking time $t_P$ is computed based on the data determined by the image analyzer using pattern recognition. This can be communicated to the driver via wireless transmission on a communications device carried by the driver, e.g., on a mobile telephone, a smartphone, a portable computer or a PDA. Further, based on location information of the driver, which can, e.g., be location information of a mobile telephone of the driver, which can be retrieved over a cellular network, a time to return $t_R$ of the driver, i.e., a time that the driver is expected to need to return to the vehicle, is determined. If the time to return $t_R$ is greater than or equal to the remaining parking time $t_P$ or even in the case that the remaining parking time $t_P$ is less than a predetermined minimum time or a minimum time determined when turning the vehicle off, then a corresponding signal is transmitted to the driver, e.g., via the driver's mobile telephone; otherwise the determination of the time to return $t_R$ and the comparison with the remaining parking time $t_P$ are repeated cyclically.

During the course of the method illustrated in FIG. 3, especially in each illustrated state, monitoring of travel data is carried out in order to determine whether the motor vehicle is started up again and the parking situation is accordingly ended; it can thus be detected, e.g., from starting of the engine or from a travelling motion of the motor vehicle, that the parking situation has ended (not shown in FIG. 3). Thereafter, according to the first step of the illustrated method, monitoring of the location and travel data are again carried out for detection of a new parking situation.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A system comprising a processor and a memory, the processor disposed to execute instructions stored in the memory, the instructions including instructions for:

detecting that a motor vehicle is in a parking situation in which a parking authorization pass is necessary for a parking permit, wherein the parking situation is determined based at least in part on one or more of data about use of a manual or automatic gear shift, operation of pedals of the motor vehicle, and activation of a parking assistance system;

on detecting the parking situation, checking for a parking authorization pass;

if no parking authorization pass is detected, providing a first information signal to a driver of the motor vehicle.

2. The system of claim 1, wherein the parking situation is determined based in part on location data of the motor vehicle.

3. The system of claim 1, wherein checking for the parking authorization pass includes using a camera directed towards a presentation area of the motor vehicle.

4. The system of claim 3, the instructions further including instructions for using the camera for at least one of a driver assistance system and a driver monitoring system in a travelling mode of the motor vehicle.

5. The system of claim 3, wherein checking for the parking authorization pass includes checking for at least one of a shape, a brightness, and a color of the parking authorization pass.

6. The system of claim 3, the instructions further including instructions for:

checking for a presentation position of the parking authorization pass; and outputting to the driver a second information signal upon determining an inadequate presentation position for visibility from outside of the motor vehicle.

7. The system of claim 1, further comprising:

checking whether the parking authorization pass verifies the necessary parking permit for the determined parking situation; and outputting to the driver a third information signal in the event of an inadequate parking permit.

8. The system of claim 1, the instructions further including instructions for:

determining that the parking permit is a temporary parking permit;

checking a currently still-available validity time $t_P$ of the parking permit; and outputting a fourth information signal to the driver if an end time point of the temporary parking permit has been reached or if a warning time that precedes the end time point of the temporary parking permit by a lead time has been reached.

9. The system of claim 8, wherein the lead time is an expected period of time $t_R$ for the driver to return to the motor vehicle.

10. The system of claim 1, wherein at least one information signal is transmitted wirelessly.

\* \* \* \* \*